W. E. SIMONDS.
Improvement in Tipping-Hooks and Lid-Lifters.
No. 132,778.             Patented Nov. 5, 1872.
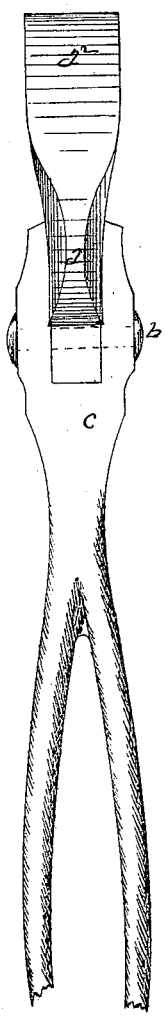
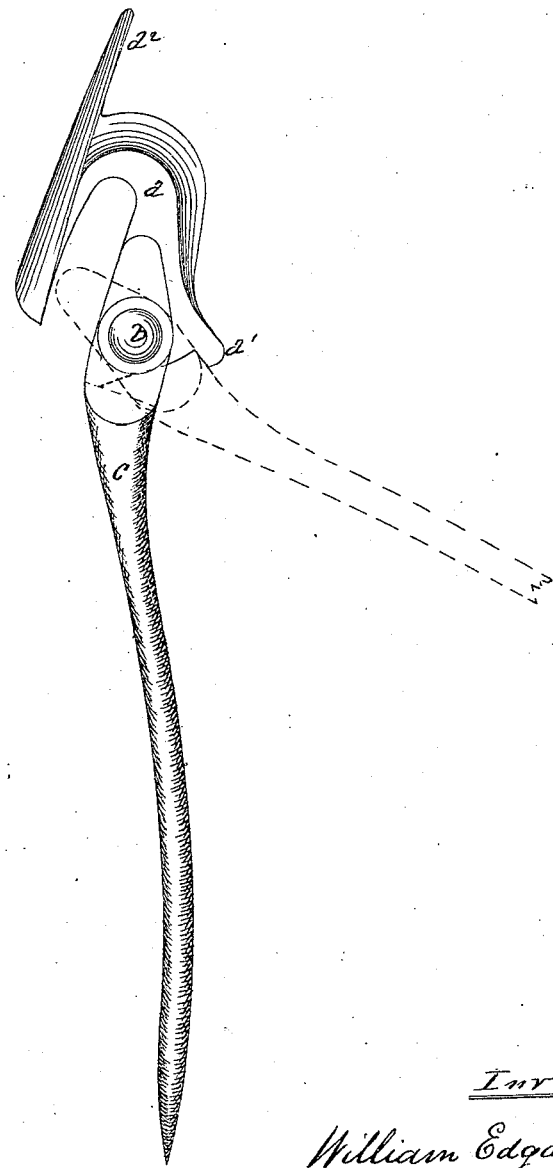
Witnesses.
Inventor:
William Edgar Simonds

UNITED STATES PATENT OFFICE.

WILLIAM EDGAR SIMONDS, OF HARTFORD, CONNECTICUT, ASSIGNOR TO GEORGE L. ROCKWELL, OF SAME PLACE.

IMPROVEMENT IN TIPPING-HOOKS AND LID-LIFTERS.

Specification forming part of Letters Patent No. 132,778, dated November 5, 1872.

*To all whom it may concern:*

Be it known that I, WM. EDGAR SIMONDS, of Hartford, in the county of Hartford and State of Connecticut, have invented a new and useful Tipping-Hook and Lid-Lifter, of which the following is a specification, reference being had to the accompanying drawing, in which—

Figure 1 is a side view. Fig. 2 is a front view.

This device is intended as an aid in emptying pots and kettles of their contents, and also as a stove-lid lifter.

The letter $a$ indicates a hook, pivoted by the rivet $b$ to the handle $c$, being hung in a slot at the upper end of the handle. The shape of the base of this hook is such as to strike upon the bottom of this slot, when the parts are in the position indicated in the figures, and prevent the hook from falling further forward. The spur $a^1$ prevents the hook from falling backward to an inconvenient and useless degree.

In using this tipping-hook, the hook $a$ is slipped upon the edge of the kettle, the device being held in the right hand of the user, while he grasps the bail of the kettle with his left. The user then lifts on the handle $c$, which tends to make it assume the position indicated by dotted lines in Fig. 1, and causes the kettle to be firmly held between the top of the handle and the inside of the hook $a$, thus enabling the user to turn out the contents of the kettle as readily as if the handle $c$ were permanently fixed to the kettle. The projection $a^2$ serves readily as a lifter for stove-lids.

I claim as my invention—

1. The tipping-hook $a$ when made with the projecting stop $a^1$, and hung between the ears upon the end of the handle $c$, as described, for the purpose set forth.

2. In combination with the hook $a$ and handle $c$, the lid-lifter projection $a^2$, as described, for the purpose specified.

WM. EDGAR SIMONDS.

Witnesses:
HUGH O'FLAHERTY,
BENJAMIN A. BOWEN.